(12) United States Patent
Wilson

(10) Patent No.: US 8,818,972 B2
(45) Date of Patent: *Aug. 26, 2014

(54) DETECTING AND COMBATING ATTACK IN PROTECTION SYSTEM OF AN INDUSTRIAL CONTROL SYSTEM

(75) Inventor: John Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,865

(22) Filed: Sep. 10, 2012

(65) Prior Publication Data

US 2013/0212669 A1 Aug. 15, 2013

Related U.S. Application Data

(63) Continuation of application No. 13/370,389, filed on Feb. 10, 2012.

(51) Int. Cl.
*G06F 17/30* (2006.01)

(52) U.S. Cl.
USPC .......................................................... 707/698

(58) Field of Classification Search
None
See application file for complete search history.

(56) References Cited

U.S. PATENT DOCUMENTS

| | | | |
|---|---|---|---|
| 5,022,076 A | 6/1991 | Rosenow et al. | |
| 5,097,470 A | 3/1992 | Gihl | |
| 5,475,601 A | 12/1995 | Hwang | |
| 6,535,769 B1 | 3/2003 | Konar | |
| 6,721,890 B1 | 4/2004 | Shrikhande | |
| 7,024,695 B1* | 4/2006 | Kumar et al. | 726/26 |
| 7,058,089 B2* | 6/2006 | Franchuk et al. | 370/503 |
| 7,123,974 B1 | 10/2006 | Hamilton | |
| 7,234,084 B2* | 6/2007 | Franchuk et al. | 714/47.3 |
| 7,649,452 B2 | 1/2010 | Zilberstein et al. | |
| 7,831,827 B2* | 11/2010 | Walmsley | 713/168 |
| 7,836,269 B2 | 11/2010 | Obereiner et al. | |
| 7,908,160 B2 | 3/2011 | Bhargava | |
| 7,990,967 B2 | 8/2011 | Brandt et al. | |
| 8,042,147 B2 | 10/2011 | Byres et al. | |

(Continued)

FOREIGN PATENT DOCUMENTS

| | | |
|---|---|---|
| EP | 1789936 B1 | 12/2009 |
| WO | 2003/107626 A2 | 12/2003 |

OTHER PUBLICATIONS

Vanoverberghe, D., et al., "Supporting Security Monitor-Aware Development," IEEE Computer Society, May 2007, Third International Workshop on Software Engineering for Systems.

(Continued)

*Primary Examiner* — Bai D. Vu
(74) *Attorney, Agent, or Firm* — Cahn & Samuels, LLP

(57) ABSTRACT

A method for detecting and combating an attack in an industrial control system includes sending a command stream from a protection network of an industrial control system to at least one zone, the command stream comprising at least one command; concatenating the at least one command into at least one sequential command package comprising units of work; passing the at least one sequential command package to a crypto hash generator; generating at least one of unit of work hash codes or sequence hash codes; comparing the generated hash codes against a database of existing valid unit of work hash codes and sequence hash codes; and if a command stream fault is detected, generating an alert and accessing a database comprising emergency procedures.

2 Claims, 7 Drawing Sheets

(56) References Cited

U.S. PATENT DOCUMENTS

| | | | |
|---|---|---|---|
| 8,060,668 B2 * | 11/2011 | Franchuk et al. | 710/29 |
| 2004/0103296 A1 | 5/2004 | Harp et al. | |
| 2007/0198106 A1 | 8/2007 | Schuster et al. | |
| 2008/0077976 A1 | 3/2008 | Schulz | |
| 2008/0079597 A1 | 4/2008 | Tambascio et al. | |
| 2009/0088874 A1 | 4/2009 | Arceo et al. | |
| 2010/0017036 A1 | 1/2010 | Sexton et al. | |
| 2010/0165878 A1 | 7/2010 | Soni | |
| 2010/0281273 A1 * | 11/2010 | Lee et al. | 713/190 |
| 2010/0287608 A1 | 11/2010 | Khuti et al. | |
| 2011/0039237 A1 | 2/2011 | Skare | |
| 2011/0060427 A1 | 3/2011 | Batke et al. | |
| 2011/0072506 A1 | 3/2011 | Law et al. | |
| 2011/0197207 A1 | 8/2011 | Bhargava | |
| 2011/0269446 A1 * | 11/2011 | Kung | 455/419 |
| 2012/0209411 A1 | 8/2012 | Ohkado et al. | |
| 2012/0272308 A1 | 10/2012 | Mishina | |
| 2012/0303143 A1 | 11/2012 | Baek | |
| 2012/0317636 A1 | 12/2012 | Mishina et al. | |

OTHER PUBLICATIONS

Xiao, K., et al., "A Workflow-Based Non-Intrusive Approach for Enhancing the Survivability of Critical Infrastructures in Cyber Environment," SESS, May 2007, 29th International Conference on Software Engineering Workshops.

Enterasys Secure Networks, "Secure Networks for Process Control," 2007.

International application No. PCT/US2013/020219, Notification of Transmittal of the International Search Report and the Written Opinion of the International Searching Authority, or the Declaration, Mar. 8, 2013.

International application No. PCT/US2013/20451, Notification of Transmittal of the International Search Report and the Written Opinion of the International Searching Authority, or the Declaration, Mar. 19, 2013.

Dzung, et al., "Security for Industrial Communication Systems," Proceedings of the IEEE, Jun. 2005, pp. 1152-1177, vol. 93, No. 6, http://isa.uniovi.es/~sirgo/doctorado/seguridad_en_communicaciones_industriales.pdf.

Grimsby, Jeanne, "Genius I/O Discrete and Analog Blocks," Sep. 1993, GE Fanuc, GEK-90486D-2.

GE Fanuc, "Series Six Redundant Processor Unit," Jun. 1990, GE Fanuc, GEK-25366C.

Office Action dated Feb. 21, 2013 in U.S. Appl. No. 13/371,511.

Office Action dated Mar. 13, 2013 in U.S. Appl. No. 13/606,615.

* cited by examiner

DETECTING AND COMBATING ATTACK IN PROTECTION SYSTEM OF AN INDUSTRIAL CONTROL SYSTEM

This application is a continuation application of U.S. Ser. No. 13/370,389 filed on Feb. 10, 2012 in the U.S. Patent and Trademark Office, the entirety of which is incorporated herein by reference.

BACKGROUND

The present invention relates to industrial control systems, more particularly, to a system and methods for detecting and combating an attack in the protection system of an industrial control system.

Industrial control systems (ICS), such as SCADA (supervisory control and data acquisition), monitor and control industrial or infrastructure facilities (e.g., oil and gas, refining, chemical, pharmaceutical, food and beverage, water and wastewater, pulp and paper, utility power, mining, metals, manufacturing facilities, etc.). Little concern has been given to the security in ICS because they have been isolated from the internet. However, more and more ICS are being interconnected to each other or connected to IT networks to control facilities smarter. Therefore, attacks on an ICS have now become a real issue, especially in light of examples of real attacks like the "Stuxnet" malware or the examples of other attacks like the Utilities in Brazil and the like.

In contrast to IT networks, ICS have some unique features as follows:
1. They may threaten human lives when they do not terminate in a predefined safety manner.
2. They often contain a number of devices in multiple zones dependent on each other.
3. They usually have a more stable or fixed configuration.
4. They cannot depend on the commercial strategy to defend only against known malware (black list approach). That is, they cannot afford an initial attack by an unknown piece of malware at all.
5. It is generally held that it is not possible to stop all intrusions into an ICS. Further, it will be likely that a target ICS will be unaware that it is infected. The first knowledge of infection will be when an attack begins to execute.

With reference to FIG. 1, a known ICS 100 comprises an ICS controller 105, at least one subcontroller 110, with each subcontroller associated with or in communication with a respective zone 115. Each zone 115 may be directly or indirectly connected to Input/Output devices 120, such as sensors and/or actuators, or may have another subcontroller 125 to which such I/O devices are connected.

There remains a need to enhance an ICS to include the ability to protect against a security attack on a protector system.

BRIEF SUMMARY

According to one or more embodiments of the present invention, a method for detecting and combating an attack in an industrial control system is provided that includes sending custom response commands from an industrial control system that may or may not be suspect; concatenating the commands into at least one sequential command package comprising units or work; passing the at least one sequential command package to a crypto hash generator; generating at least one of unit of work hash codes or sequence hash codes; comparing the generated hash codes against a first database comprising existing valid unit or work has codes and sequence hash codes; and if a command stream fault is detected, generating an alert and accessing a second database comprising emergency procedures.

According to one or more embodiments of the present invention, a method for detecting and combating an attack in an industrial control system is provided that includes sending a command stream from a protection network of an industrial control system to at least one zone, said command stream comprising at least one command; concatenating the at least one command into at least one sequential command package comprising units of work and a sequence of units of work; passing the at least one sequential command package to a crypto hash generator; generating at least one of unit of work hash codes or sequence hash codes; comparing the generated hash codes against a database of existing valid unit of work hash codes and sequence hash codes in read-only format; and if a command stream fault is detected, generating an alert; accessing a database comprising emergency procedures; and suspending or terminating at least one process in a predetermined ordered sequence in the at least one zone.

According to one or more embodiments of the present invention, a system for detecting and combating an attack in an industrial control system is provided that includes an industrial system comprising at least one controller and at least one zone, the at least one zone in communication with at least one input/output device; a protector system independent of the industrial control system and comprising at least one firewall/gateway; and a switch in communication with at least one of the at least one controller, the at least one input/output device, or the at least one firewall/gateway.

According to one or more embodiments of the present invention, a computer program product for detecting and combating an attack in an industrial control system is provided that includes a computer readable storage medium. First program instructions send a command stream from a protection network of an industrial control system to at least one zone, the command stream comprising at least one command. Second program instructions concatenate the at least one command into at least one sequential command package comprising units or work. Third program instructions pass the at least one sequential command package to a crypto hash generator. Fourth program instructions generate at least one of unit of work hash codes or sequence hash codes. Fifth program instructions compare the generated hash codes against a first database of existing valid unit of work hash codes and sequence hash codes. Sixth program instructions generate an alert and access a second database comprising emergency procedures if a command stream fault is detected. The first, second, third, fourth, fifth, and sixth program instructions are stored on the computer readable storage medium.

DETAILED DESCRIPTION

Figure 1:
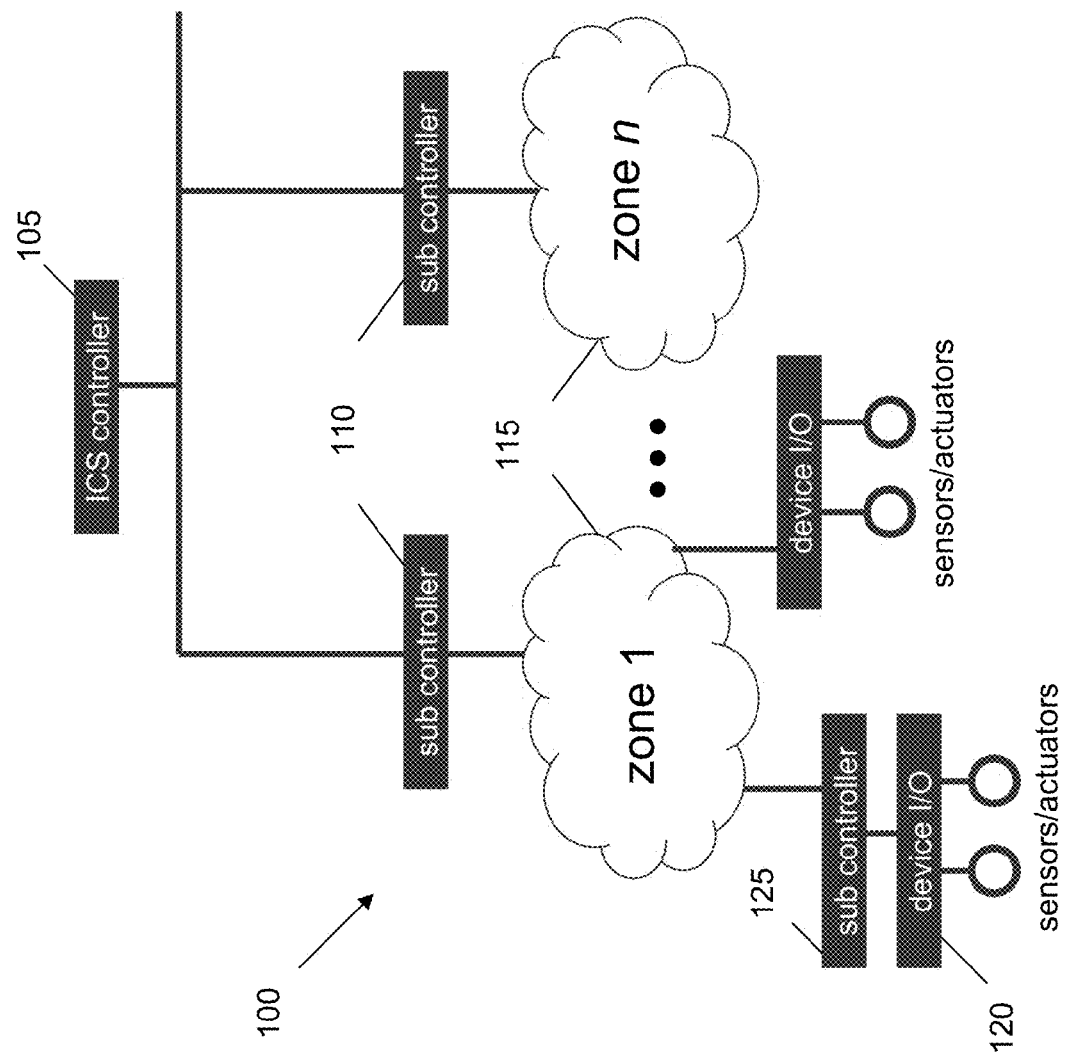
FIG. 1 is a schematic diagram of a known industrial control system (ICS).
Figure 2:
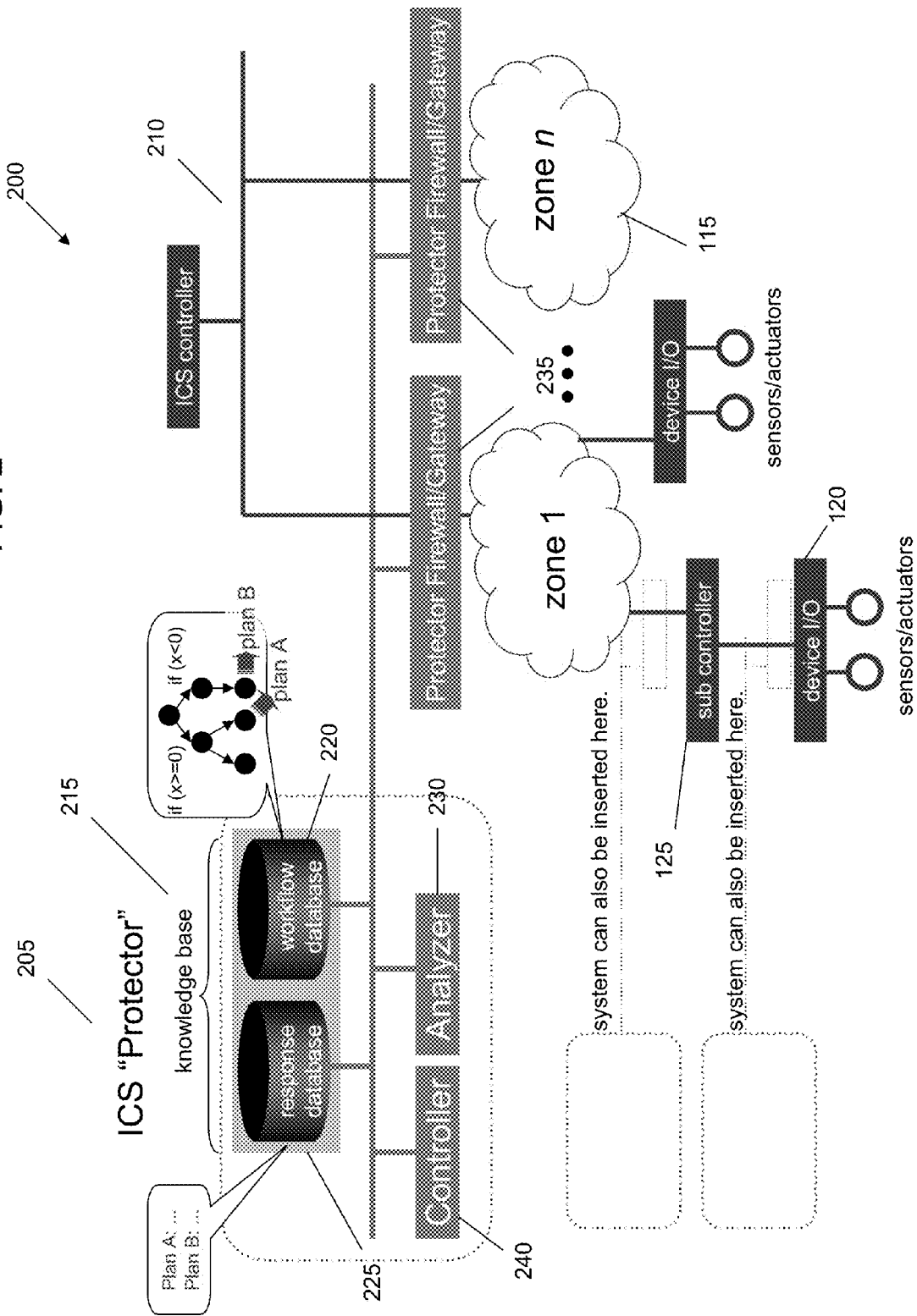
FIG. 2 is a schematic diagram of an ICS with a protection system.

With reference now to FIG. 2, a schematic diagram of an ICS with a protection system or network is illustrated. An architecture 200 that detects specific situations of industrial control systems and performs appropriate actions at each situation includes a protection network 205 (ICS Protector and at least one firewall/gateway) independent of ICS network 210.

The protection network 205 includes a knowledge base 215 containing enhanced workflow data and cure plans not only for anomalies, but also for unanticipated disruptions in the work flow. A workflow database 220 comprises enhanced workflow data which comprises a normal workflow tree 222 with conditions. A response database 225 comprises cure plans not only for anomalies, but also for any situation where the workflow is disturbed.

The independent protection network 205 also comprises an event analyzer 230. The event analyzer 230 may detect at least one event that triggers an appropriate cure or plan action based on data from at least one firewall/gateway 235 (e.g., a micro firewall) and from knowledge from the knowledge base 215.

The independent protection network 205 also comprises a controller 240, which receives reports from the event analyzer 230 and directs specific reactions given by the event analyzer 230 to at least one firewall/gateway 235. In specific embodiments, the controller 240 may direct reactions given by the event analyzer 230 to a plurality of firewall/gateways 235 simultaneously.

As shown in FIG. 2, the at least one firewall/gateway 235 of the protection network may be installed at an entry point of the at least one zone 115. The at least one firewall/gateway 235 monitors and controls inbound and outbound data flow, reports to the event analyzer 230, and is capable of directing operations to devices 120 in each zone based on the direction given by controller 240. In additional embodiments, the independent protection network 205 may be inserted between at least one zone 115 and a subcontroller 125 or between a subcontroller 125 and I/O devices 120.

If the ICS 210 is discovered to be under attack, a first response may be to place the I/O devices (for example, sensors, actuators, circuits, valves, breakers, pumps, heaters, coolers, regulators, modems, lights, conveyors, computers, etc.) in a suspend, hold, or termination mode in an orderly fashion and a proper sequence across at least one zone 115, for example, all existing zones. Thus, when the independent protection network 205 detects an anomaly in the ICS event stream, it may take over and deliver appropriate suspend, hold, or termination commands across at least one zone 115 and immediately alert plant operations staff. In a specific embodiment, the at least one firewall/gateway 235 may be instructed to ignore ICS commands and pass through commands from the protection network 205, whose purpose would be to shut down, terminate, or suspend processes in a predetermined ordered sequence.

The predetermined ordered sequence may be different depending upon the configuration of the industrial control system and/or infrastructure facility and the configuration of input/output devices in the facility. For example, in a specific embodiment, instead of removing heat from a reaction vessel first and then pumping out the contents, the ordered sequence may comprise keeping the vessel contents at the proper temperature to insure proper viscosity, then pumping the vessel clear and turning off a heater. In another embodiment, the ordered sequence may comprise shutting off a feedstock pump in a cracking unit before shutting off the feed to a condenser or a sidecut stripper, and then shutting down the distillation column when the temperature and pressure are at appropriate levels. In some facilities, it may be desirable that the last device to be shut off is a ventilation system.

Adding a protection network or system 205 into an industrial control system offers enhanced protection to the ICS, but it may create another exposure. What if malware decided to attack the protection network? This would be much more difficult than attacking the ICS, but it must be considered a possibility. Another copy of a protection network could be implemented to oversee the original protection network, but this second protection network would have the same vulnerabilities as the original protection network.

Figure 3:
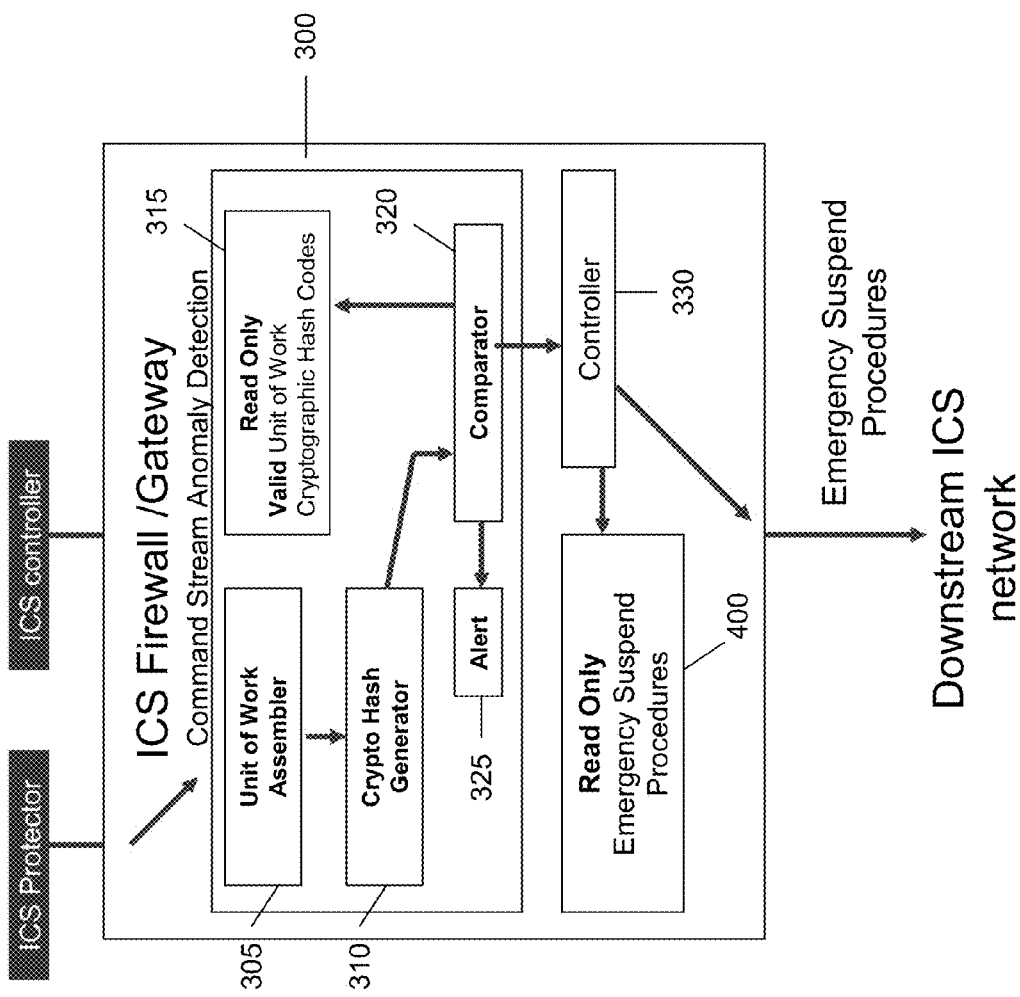
FIG. 3 is a schematic diagram of a switch and a set of emergency procedures in communication with a protector firewall/gateway.
Figure 4:
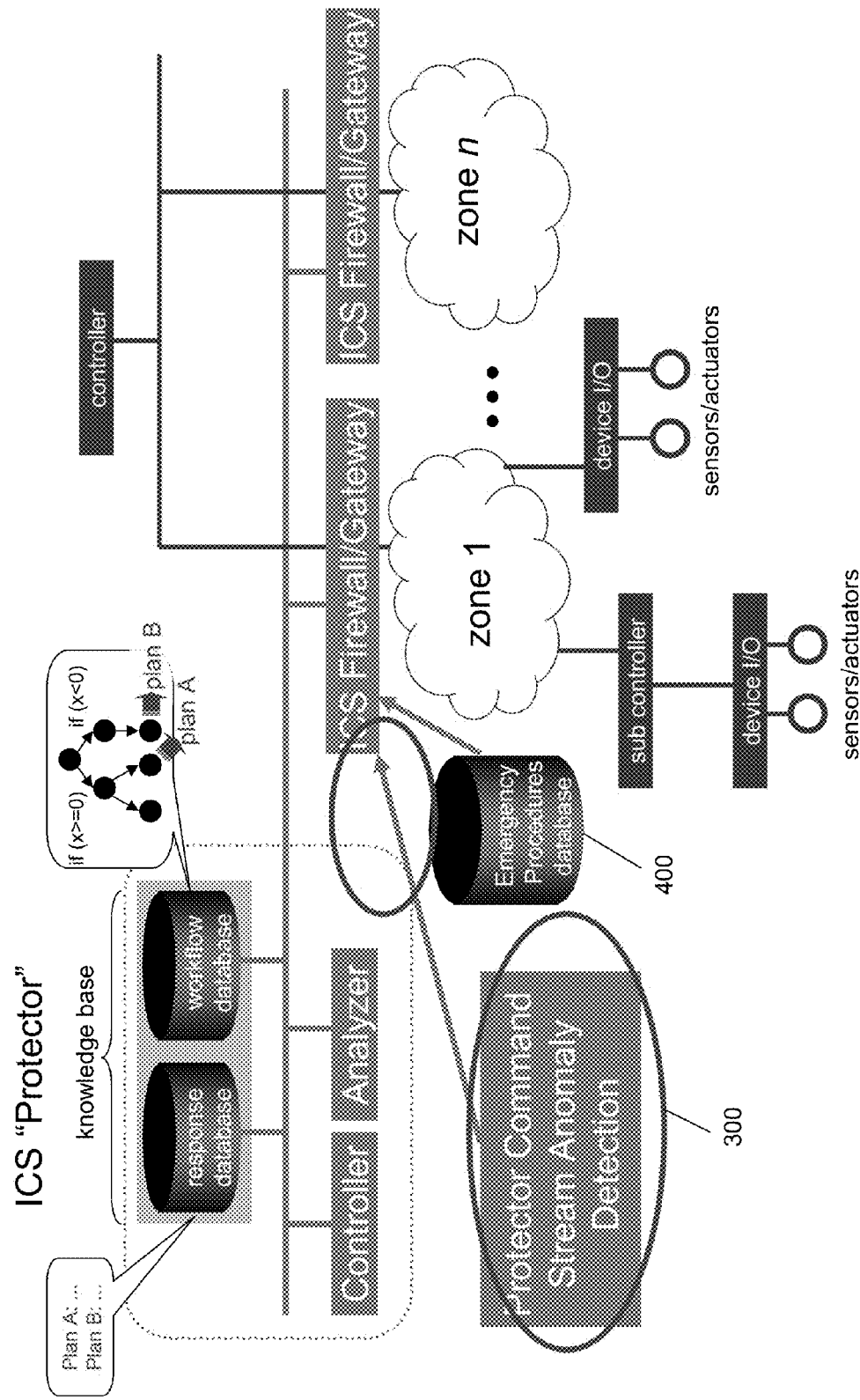
FIG. 4 is a schematic diagram of an ICS with the switch of FIG. 3 according to an embodiment of the present invention.

With reference now to FIGS. 3-4, a protector command stream anomaly detection switch 300 and emergency procedures database 400 are provided. The emergency procedures database 400 comprises emergency procedures in read-only memory and may be an integral part of the switch (FIG. 3) or may comprise a separate database (FIG. 4). Although the switch is discussed below with respect to monitoring commands from a protector network or system 205, it could also be used to monitor commands from the base ICS system 210.

The switch 300 is in communication with the at least one firewall/gateway 235. However, in other embodiments, the switch 300 may be in communication with at least one of ICS controller 105, at least one subcontroller 125, or at least one I/O device 120. As used herein, "in communication" includes physical and wireless connections that are indirect through one or more additional components (or over a network) or directly between the two components described as being in communication.

The switch 300 comprises a unit of work assembler 305; a crypto hash generator 310; a database of valid unit of work cryptographic hash codes in read-only memory 315; a comparator 320; and an alert system 325. In addition, the switch 300 comprises a controller 330. In embodiments, the controller 330 may be an integral part of the switch or may be a separate element in communication with the switch. The unit of work assembler 305, crypto hash generator 310, comparator 320, alert system 325, and controller 330 may individually or together comprise one or more processors having embedded application logic or program code.

Figure 5:
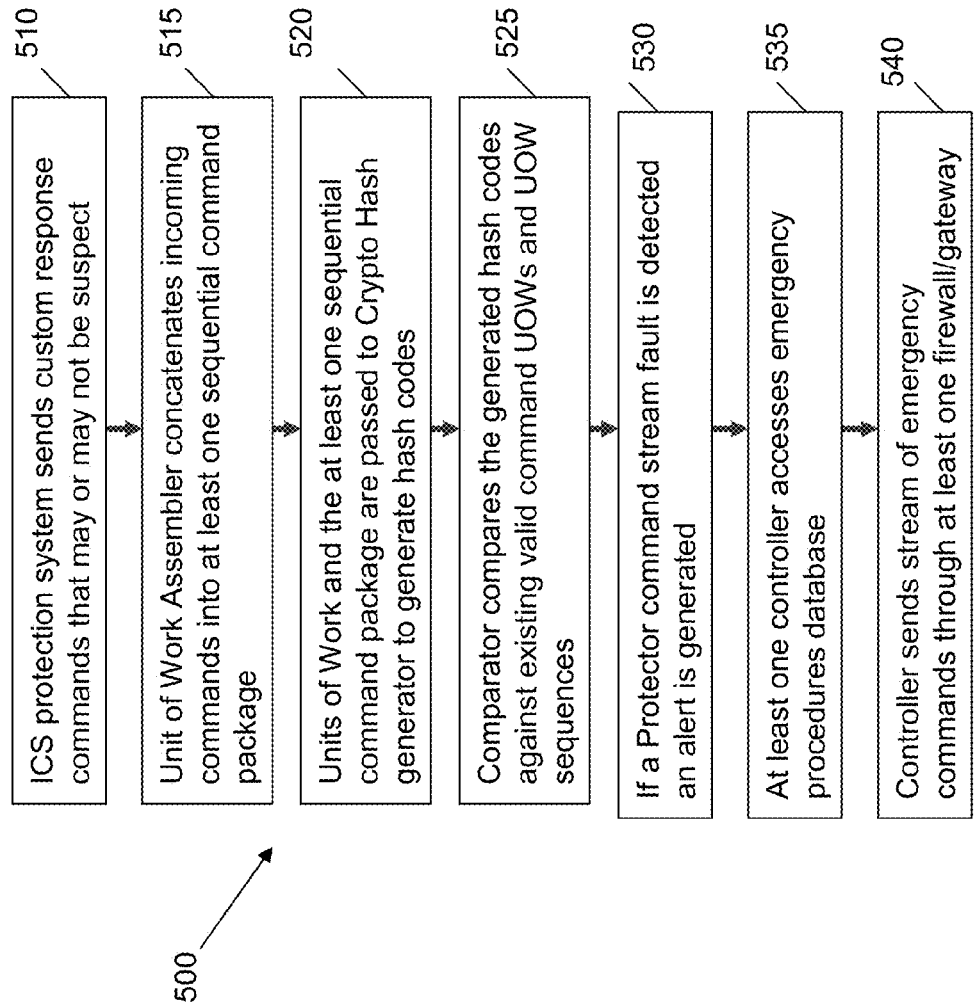
FIG. 5 is a flowchart according to an embodiment of the present invention.
Figure 6:
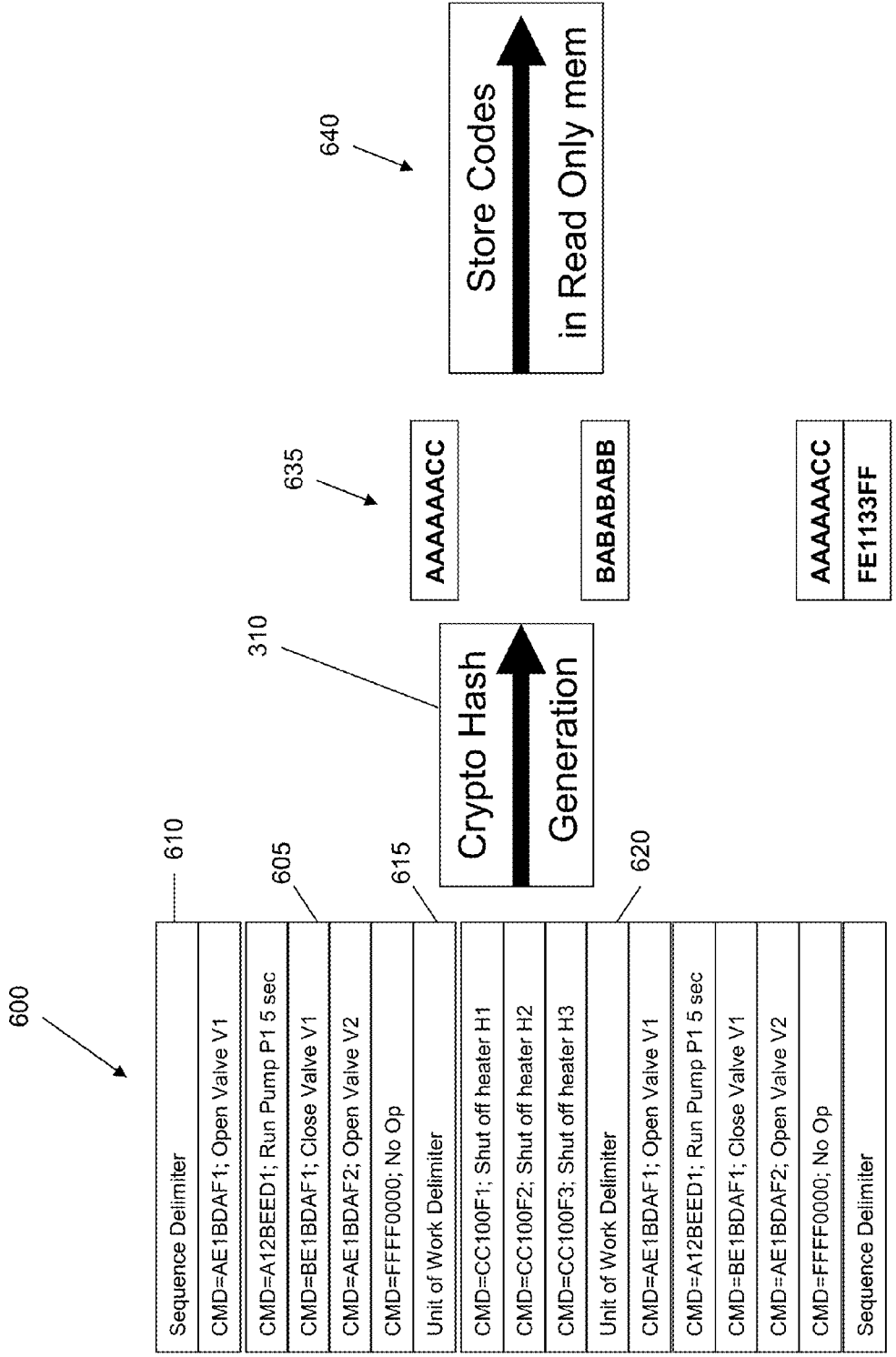
FIG. 6 is a schematic diagram of crypto hash generation according to an embodiment of the present invention.

With reference now to FIG. 5, a flowchart for a method 500 according to an embodiment of the present invention is provided. An ICS protection network sends custom response commands that may or may not be suspect, for example, to the at least one firewall/gateway, 510. The unit of work assembler concatenates the incoming commands into at least one sequential command package, 515. Units of work (UOW) and the at least one concatenated sequential command package are passed to the crypto hash generator which generates at least one of UOW hash codes or sequence hash codes, 520 (FIG. 6). The comparator compares the generated hash codes against a database of existing valid command UOWs and UOW sequences in read-only memory, 525. If a protector command stream fault is detected, an alert is generated, 530, and the at least one controller accesses the emergency suspend procedures database, 535. The controller sends a stream of emergency suspend or termination commands through the at least one firewall/gateway, 540.

A "crypto hash" or cryptographic hash function is a hash function that may be defined as a deterministic procedure that takes an arbitrary block of data and returns a fixed-size bit string, the (cryptographic) hash value, such that an accidental or intentional change to the data will change the hash value. The data to be encoded is often called the "message," and the hash value is sometimes called the message digest or simply digest. A cryptographic hash function may have four properties: it is easy (but not necessarily quick) to compute the hash value for any given message; it is infeasible to generate a message that has a given hash; it is infeasible to modify a message without changing the hash; and it is infeasible to find two different messages with the same hash.

In specific embodiments, a command stream fault may appear in different ways. For example, a command UOW and/or a sequence UOW may not be found in the database of valid command and sequence UOW codes. This may indicate that some unexpected command UOW or sequence UOW has been added to the command stream.

In addition, or alternatively thereto, an order of command UOWs and sequence UOWs may be compromised. According an embodiment of the present invention, the hash codes for sequence UOWs protects against out of order command UOWs or valid command UOWs that have been inserted into the command stream in an unexpected way. For example, a high level of UOW may encapsulate sequence UOWs and therefore protect the order of the sequence UOWs, but in practice that might delay the detection of sequence UOWs being out of order. As more function would be in the sequence UOW, the odds are higher that more damage might occur, so this should be discovered quickly. Thus, a next-expected or set of expected sequence UOWs may be stored in the database of valid command and sequence UOW Codes. The database can be checked to make sure that the next sequence UOW is in a given set of sequence UOWs, for example, of at least one sequential command package. Thus, the read-only memory database (PROM) may store a set of potential following sequence UOWs for each sequence UOW.

With reference now to FIG. 6, a method of creating a set of valid unit of work (UOW) and UOW sequence hash codes according to an embodiment of the present invention is illustrated. For example, a protection network sends a valid suspend procedure command stream 600 for at least one downstream zone of an industrial control system. The command stream comprises at least one command, for example a plurality of commands 605. The unit of work assembler concatenates the incoming commands into at least one sequential command package having an ordered sequence delimiter 610 comprising unit of work delimiters 615, 620. The at least one sequential command package is sent to the crypto hash generator 310 to generate valid UOW hash codes and valid UOW sequence hash codes, 635. Then UOW hash codes and UOW sequence hash codes and stored in the read-only memory database (PROM), 640.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
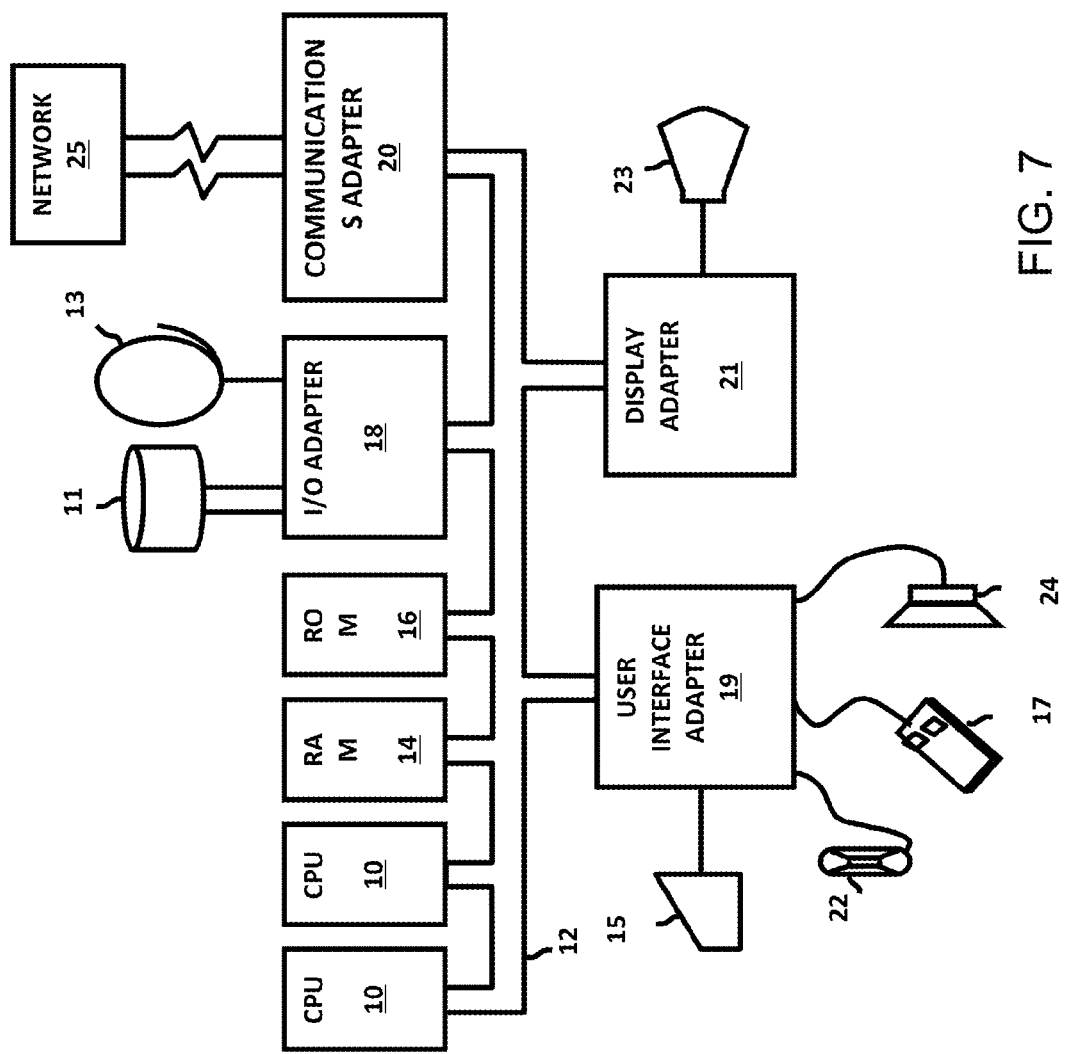
FIG. 7 is a schematic diagram of a system according to an embodiment of the present invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for suspension of processes in an industrial control system, comprising:
   a non-transitory computer readable storage medium;
   first program instructions to send a command stream from a protection network of the industrial control system to at least one zone, said command stream comprising at least one command;
   second program instructions to concatenate the at least one command into at least one sequential command package comprising an ordered sequence delimiter comprising units of work delimiters;
   third program instructions to pass the at least one sequential command package to a crypto hash generator;
   fourth program instructions to generate units of work hash codes and sequence hash codes;
   fifth program instructions to compare the generated hash codes against a first database of existing valid unit of work hash codes and sequence hash codes and,
   sixth program instructions generate an alert and access a second database comprising emergency procedures if a command stream fault is detected,
   wherein said first, second, third, fourth, fifth, and sixth program instructions are stored on said non-transitory computer readable storage medium,
   wherein the second, third, fourth, and fifth program instructions are via a switch in communication with at least one firewall/gateway.

2. The computer program product according to claim 1, wherein the switch comprises a unit of work assembler, the crypto hash generator, a comparator, and an alert system, said switch comprising one or more processors having embedded application logic or program code.

* * * * *